[12] United States Patent
de Cesare et al.

(10) Patent No.: US 9,479,331 B2
(45) Date of Patent: Oct. 25, 2016

(54) MANAGING SECURITY IN A SYSTEM ON A CHIP (SOC) THAT POWERS DOWN A SECURE PROCESSOR

(71) Applicant: Apple Inc., Cupertino, CA (US)

(72) Inventors: Joshua P. de Cesare, Campbell, CA (US); Anand Dalal, San Jose, CA (US)

(73) Assignee: Apple Inc., Cupertino, CA (US)

( * ) Notice: Subject to any disclaimer, the term of this patent is extended or adjusted under 35 U.S.C. 154(b) by 119 days.

(21) Appl. No.: 14/463,763

(22) Filed: Aug. 20, 2014

(65) Prior Publication Data

US 2016/0055102 A1  Feb. 25, 2016

(51) Int. Cl.
G06F 21/64 (2013.01)
H04L 9/08 (2006.01)
G06F 21/00 (2013.01)

(52) U.S. Cl.
CPC ............ H04L 9/0869 (2013.01); G06F 21/00 (2013.01); *G06F 2212/1052* (2013.01); *H04L 2209/24* (2013.01)

(58) Field of Classification Search
CPC .......... G06F 12/1416; G06F 12/1458; G06F 21/575; G06F 21/78; G06F 21/6218; G06F 21/74; G06F 21/602; G06F 21/70; G06F 21/71
USPC ................................ 713/193, 300, 320, 324
See application file for complete search history.

(56) References Cited

U.S. PATENT DOCUMENTS 6,593,845 B1   7/2003  Friedman
6,748,548 B2   6/2004  Bormann
6,775,750 B2 * 8/2004  Krueger ............... G06F 12/1483
                                                                    710/200
7,120,771 B2  10/2006  Dahan et al.
7,797,523 B2   9/2010  Hobson et al.
7,890,753 B2   2/2011  Dahan et al.
7,991,992 B2   8/2011  Guan et al.
8,112,618 B2 * 2/2012  Brokish ................ G06F 21/575
                                                                    713/1
8,583,953 B2  11/2013  Sultenfuss
2004/0221185 A1 11/2004  Bose
2008/0168286 A1  7/2008  Tupman
2008/0282101 A1 11/2008  Adams
2009/0259854 A1 * 10/2009  Cox ....................... G06F 21/575
                                                                    713/189

(Continued)

FOREIGN PATENT DOCUMENTS

TW          201342238 A     10/2013

OTHER PUBLICATIONS iOS Security, White Paper, pp. 1-33, Feb. 2014.

(Continued)

*Primary Examiner* — Izunna Okeke
*Assistant Examiner* — Hee Song
(74) *Attorney, Agent, or Firm* — Meyertons, Hood, Kivlin, Kowert & Goetzel, P.C.; Lawrence J. Merkel (57) ABSTRACT

An SOC includes a secure processor and an always-on component. The always-on component may remain powered even during times that other parts of the SOC are powered off. Particularly, the secure processor and related circuitry may be powered off, while various state for the secure processor may be stored in memory in an encrypted form. Certain state may be stored in the always-on component. When the secure processor is powered on again, the secure processor may check for the state in the always-on component. If the state is found, the secure processor may retrieve the state and use the state to access the encrypted memory state.

18 Claims, 5 Drawing Sheets

(56) References Cited

U.S. PATENT DOCUMENTS

| | | |
|---|---|---|
| 2009/0259865 A1 | 10/2009 | Sheynblat et al. |
| 2010/0131681 A1* | 5/2010 | Reddy ............... G06F 13/126 710/36 |
| 2011/0154484 A1* | 6/2011 | Shimabe ............ G06F 21/575 726/19 |
| 2012/0005526 A1* | 1/2012 | Sela .................. G06F 21/78 714/15 |
| 2012/0254878 A1 | 10/2012 | Nachman et al. |
| 2013/0073884 A1 | 3/2013 | Ulmer et al. |
| 2013/0111092 A1 | 5/2013 | Heller et al. |
| 2013/0261814 A1 | 10/2013 | Shrall et al. |
| 2013/0326206 A1* | 12/2013 | Lueck ................ G06F 9/4418 713/2 |
| 2014/0009650 A1 | 1/2014 | Kim et al. |
| 2014/0075226 A1 | 3/2014 | Heo et al. |
| 2014/0149770 A1 | 5/2014 | Ahmad et al. |
| 2014/0223217 A1* | 8/2014 | Nabhane ............ G05F 1/625 713/340 |
| 2014/0369495 A1* | 12/2014 | Muchsel ............ H04L 9/0866 380/44 |
| 2015/0089245 A1* | 3/2015 | Altman .............. G06F 21/79 713/193 |
| 2015/0106631 A1* | 4/2015 | Bettendorff ........ G06F 21/00 713/193 |
| 2015/0248568 A1* | 9/2015 | Offenberg .......... G06F 21/6218 713/193 |

OTHER PUBLICATIONS

U.S. Appl. No. 14/458,885, filed Aug. 13, 2014, Brijesh Tripathi.
U.S. Appl. No. 14/458,949, filed Aug. 13, 2014, Brijesh Tripathi.
U.S. Appl. No. 14/289,775, filed May 29, 2014, Anand Dalal.
Office Action, U.S. Appl. No. 14/458,949, Brijesh Tripathi, mailed Mar. 14, 2016, 17 pages.
Office Action, U.S. Appl. No. 14/289,775, Anand Dalai, mailed Jan. 29, 2016, 16 pages.

* cited by examiner

Fig. 6

MANAGING SECURITY IN A SYSTEM ON A CHIP (SOC) THAT POWERS DOWN A SECURE PROCESSOR

BACKGROUND

1. Technical Field

Embodiments described herein are related to a system on a chip (SOC) including a secure processor and an always-on component.

2. Description of the Related Art

As the number of transistors that can be incorporated on a single semiconductor substrate "chip" continues to increase, the variety and complexity of functionality on the chip continues to increase as well. One way in which the available transistors can be used is to form an SOC. The SOC generally includes one or more processors and various other components (e.g. one or more memory controllers, various peripheral components, etc.).

Because SOCs incorporate significant functionality in a small form factor, and because SOCs can be made power efficient, SOCs are a popular device to include in mobile devices such a portable phones (cell phones), personal digital assistants (PDAs), smart phones that combine phone functionality and other computing functionality such as various PDA functionality and/or general application support, tablet computers, laptops, net tops, smart watches, wearable electronics, etc. These mobile devices have significant processing power and are increasingly being used for financial management and financial transactions, user communications other than voice (text, email, web browsing, etc.), streaming video, etc. Accordingly, SOCs may operate on private user data as well as data belonging to others (e.g. copyrighted audio, video, and still images). Accordingly, the security of the SOC and its ability to resist attacks meant to compromise secure data are becoming increasingly important features.

Many mobile devices may operate in a "standby" mode much of the time. In the standby mode, the device may appear to be "off," in as much as the device is not actively displaying content for the user and/or not actively performing functionality for the user. In the standby mode, much of the device may indeed by powered off. However, in the background, the device may be listening for phone calls or network packets, checking for alarms, reacting to movement, etc.

Because the mobile devices are often operating from a limited supply (e.g. a battery), energy conservation is a key design consideration for the devices. In "standby" mode and other low power modes, it is desirable to power down the SOC to eliminate leakage current losses, which are a significant factor in energy consumption in modern integrated circuit technologies. On the other hand, the SOC is needed for some of the standby functionality mentioned above. Accordingly, the SOC (or portions thereof) may be powered up and powered down repeatedly during use, even though the overall mobile device is not completely off. This operation further complicates ensuring the security of the device as the SOC may be vulnerable to attack during power up/power down operations.

SUMMARY

An SOC includes a secure processor and an always-on component. The always-on component may remain powered even during times that other parts of the SOC are powered off. Particularly, the secure processor and related circuitry may be powered off, while various state for the secure processor may be stored in memory in an encrypted form. Certain state may be stored in the always-on component. When the secure processor is powered on again, the secure processor may check for the state in the always-on component. If the state is found, the secure processor may retrieve the state and use the state to access the encrypted memory state. Recovering from a power down event may be simplified, which may reduce the ability to attack the secure apparatus of the SOC and thus may improve the overall security of the mobile device that uses the SOC.

BRIEF DESCRIPTION OF THE DRAWINGS

The following detailed description makes reference to the accompanying drawings, which are now briefly described.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112(f) interpretation for that unit/circuit/component.

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

DETAILED DESCRIPTION OF EMBODIMENTS

Figure 1:
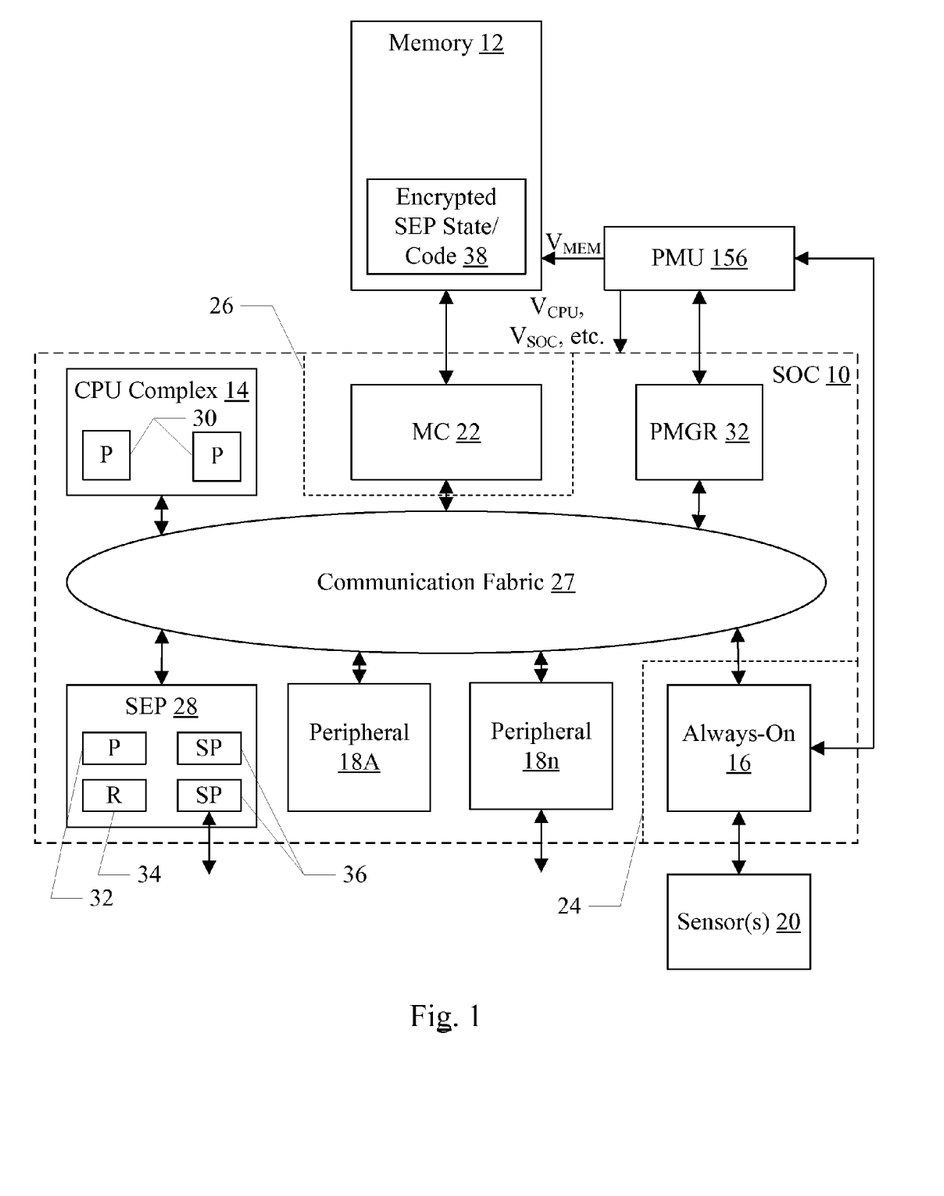
FIG. 1 is a block diagram of one embodiment of an SOC.

Turning now to FIG. 1, a block diagram of one embodiment of an SOC 10 is shown coupled to a memory 12, at least one sensor 20, and a power management unit (PMU) 156. As implied by the name, the components of the SOC 10 may be integrated onto a single semiconductor substrate as an integrated circuit "chip." In some embodiments, the components may be implemented on two or more discrete chips in a system. However, the SOC 10 will be used as an example herein. In the illustrated embodiment, the components of the SOC 10 include a central processing unit (CPU) complex 14, an "always-on" component 16, peripheral components 18A-18n (more briefly, "peripherals 18" or "peripheral components 18"), a memory controller 22, a power manager (PMGR) 32, a security enclave processor (SEP) 28, and a communication fabric 27. The components 14, 16, 18A-18n, 22, 28, and 32 may all be coupled to the communication fabric 27. The memory controller 22 may be coupled to the memory 12 during use. The PMGR 32 and the always-on component 16 may be coupled to the PMU 156 during use. The PMU 156 may be configured to supply various power supply voltage to the SOC, the memory 12, and/or the sensors 20. The always-on component 16 may be coupled to the sensors 20 during use. In the illustrated embodiment, the CPU complex 14 may include one or more processors (P 30 in FIG. 1). The processors 30 may form the CPU(s) of the SOC 10. In the illustrated embodiment, the SEP 28 includes one or more processors 32, a secure boot ROM 34, and one or more security peripherals 36. The processor(s) 30 may be referred to herein as CPU processor(s) 30, and the processor(s) 32 may be referred to herein as secure processor(s) 32 or SEP processor(s) 32.

The SEP 28 is an example of a security circuit or a secure component. Generally, a security circuit/secure component may be any circuitry that is configured to perform one or more secure services for the rest of the SOC 10 (e.g. the other components in the SOC 10). That is, a component may transmit a request for a secure service to the secure component, which may perform the secure service and return a result to the requestor. The result may be an indication of success/failure of the request and/or may include data generated by performing the service. For example, secure services may include various cryptographic services such as authentication, encryption, decryption, etc. The result of authentication may be a pass/fail, for example. The result of encryption/decryption may be the encrypted/decrypted data. Secure services may include secure key generation, where the keys may be used by components external to the secure component for various security functions such as encryption or authentication. The result of secure key generation may be the key, or a wrapped key which has been encrypted using a key that has been supplied to the requestor in hardware that is not accessible to software.

A secure component may include any desired circuitry (e.g. cryptographic hardware, hardware that accelerates certain operations that are used in cryptographic functions, etc.). A secure component need not include a processor. In some embodiments, e.g. the embodiment shown in FIG. 1, a processor is included. The SEP processor 32 may execute securely-loaded software. For example, a secure read-only memory (ROM) 34 may include software executable by the SEP processor 32. One more of the security peripherals 36 may have an external interface, which may be connected to a source of software (e.g. a non-volatile memory such as Flash memory). In another embodiment, the source of software may be a non-volatile memory coupled to another peripheral 18, and the software may be encrypted to avoid observation by a third party. The software from the source may be authenticated or otherwise verified as secure, and may be executable by the SEP processor 32. In some embodiments, software may be loaded into a trust zone in the memory 12 that is assigned to the SEP 28 and the SEP processor 32 may fetch the software from the trust zone for execution. The software may be stored in the memory 12 in encrypted form to avoid observation. In addition to the software, various other SEP state may be stored in the memory 12 in encrypted form. Together, the software and/or state may be referred to as secure data 38 in FIG. 1.

In an embodiment, portions of the SOC 10 may be powered down to reduce power consumption during use. The always-on component 16 may be configured to remain powered up when other components of the SOC 10 (e.g. the CPU complex 14, the peripherals 18A-18n, the SEP 28, and the PMGR 32) are powered down. More particularly, the always-on component 16 may be on whenever the SOC 10 is receiving power from the PMU 156. Thus, the always-on component is "always-on" in the sense that it may be powered if the SOC 10 is receiving at least some power (e.g. at times when the device including the SOC 10 is in standby mode or is operating actively. The always-on component 16 may not be powered when the SOC 10 is not receiving any power (e.g. at times when the device is completely turned off). The always-on component 16 may support certain functions while the remainder of the SOC 10 is off, allowing low power operation.

The memory 12 may be placed in a retention mode when components of the SOC 10 other than the always-on component 16 are powered down. The retention mode may retain the data stored in the memory 12 (e.g. the encrypted SEP data 38), but the data may not be accessible in the retention mode. Because the data remains stored in the memory 12, returning from the powered down state may be more rapid than an initial boot of the system (or initialization of the system). The state in which the system has placed the memory 12 in retention mode and powered down components of the SOC 10 may be referred to as the "suspend to RAM" state. The retention mode may be any low power mode in which the memory retains data. For various types of dynamic random access memory (DRAM), the retention mode may be the self-refresh state.

The SEP 28 may use certain state in order to access the SEP data 38 when powered up again after a power down event. For example, the SEP data 38 may be encrypted using one or more keys that were present in SEP 28 prior to powering down. In one embodiment, the keys were generated in the SEP 28 responsive to one or more seeds. The seeds may be used to regenerate the keys. In an embodiment, the always-on component 16 may store the seeds. The SEP 28 may read the seeds in response to power up and may use the seeds to regenerate the keys, thus permitting access do the SEP data 38. Other state may be stored in the always-on component 16 as well. The always-on component 16 may permit only requests sourced by the SEP 28 to access the SEP state stored in the always-on component 16, to maintain security of the SEP state.

Secure services may include any services related to ensuring the protection of private data and/or preventing the unauthorized use of the system including the SOC 10. Protecting private data may include preventing unauthorized access (e.g. theft of data) and/or preventing corruption/destruction of the data. Protecting private data may include ensuring the integrity and confidentiality of the data, and the availability of the data to authorized access. Preventing unauthorized use may include, e.g., ensuring that a permitted use is paid for (e.g. network access by a portable device) and may also include ensuring that nefarious acts are prevented. Nefarious acts may include, for example, use of a device to consume power from a battery of the device so that authorized use is curtailed due to a lack of power, acts to cause damage to the system or to another system that interacts with the system, use of the device to cause corruption of data/software, etc. Secure services may include ensuring that the use of the system is available to authorized users as well, and authenticating authorized users.

The SEP 28 may be isolated from the rest of the SOC 10 except for a carefully-controlled interface (thus forming a secure enclave for the SEP processor 32, the secure boot ROM 34, and the security peripherals 36). Because the interface to the SEP 28 is carefully controlled, direct access to the SEP processor 32, the secure boot ROM 34, and the security peripherals 36 may be prevented. In one embodiment, a secure mailbox mechanism may be implemented. In the secure mailbox mechanism, external devices may transmit messages to an inbox. The SEP processor 32 may read and interpret the message, determining the actions to take in response to the message. Response messages from the SEP processor 32 may be transmitted through an outbox, which is also part of the secure mailbox mechanism. Other interfaces that permit only the passing of commands/requests from the external components and results to the external components may be used. No other access from the external devices to the SEP 28 may be permitted, and thus the SEP 28 may be "protected from access".

The security peripherals 36 may be hardware configured to assist in the secure services performed by the SEP 16. For example, the security peripherals may include authentication hardware implementing/accelerating various authentication algorithms, encryption hardware configured to perform/accelerate encryption, secure interface controllers configured to communicate over a secure interface to an external (to the SOC 10) device, etc.

In FIG. 1, a dotted line 24 separating the always-on component 16 from the other components may indicate an independent power domain for the always-on component 16. Similarly, in the illustrated embodiment, a dotted line 26 may represent an independent memory controller power domain for the memory controller 22. Other components, groups of components, and/or subcomponents may have independent power domains as well. Generally, a power domain may be configured to receive supply voltage (i.e. be powered on) or not receive supply voltage (i.e. be powered off) independent of other power domains. In some embodiments, power domains may be supplied with different supply voltage magnitudes concurrently. The independence may be provided in a variety of fashions. For example, the independence may be provided by providing separate supply voltage inputs from the PMU 156, by providing power switches between the supply voltage inputs and components and controlling the power switches for a given domain as a unit, and/or a combination of the above. There may be more power domains than those illustrated in FIG. 1 as well. For example, the CPU complex 14 may have an independent power domain (and each CPU processor 30 may have an independent power domain as well) in an embodiment. One or more peripheral components 18A-18B may be in one or more independent power domains in an embodiment.

As illustrated in FIG. 1, the always-on component 16 may be coupled to at least one sensor 20 (and may be coupled to multiple sensors 20). The always-on component 16 may be configured to read the sensor data from the sensors 20 while the SOC 10 is powered off (in addition to the times when the SOC 10 is powered on). The always-on component 16 may include a memory (not shown in FIG. 1) to buffer the sensor data, and the remainder of the SOC 10 need not be powered up unless the memory (or a portion thereof allocated to store sensor data) fills with data (or reaches a threshold level of fullness). In some embodiments, the always-on component 16 may be configured to process the sensor data in some fashion as well. For example, the always-on component 16 may be configured to filter the sensor data. Filtering data may generally refer to one or more of: searching for a pattern or other data properties that indicate that the sensor data should be further processed by the processors in the CPU complex 14; manipulating the data to detect/remove noise in the data; further processing data that appears to match a pattern or other property to eliminate false positive matches; etc.

The sensors 20 may be any devices that are configured to detect or measure aspects of the physical environment of a device that includes the sensors. For example, a sensor may include an accelerometer which measures acceleration of the device. An accelerometer may be directional (measuring acceleration in a predetermined direction) or vector (measuring acceleration in multiple dimensions and producing a vector indicating the acceleration and its direction). Multiple directional accelerometers may be employed to permit vector acceleration sensing as well as directional acceleration sensing. Another example of a sensor may be gyroscope (or gyro). The gyroscope may be used to detect the orientation of the device and/or changes in orientation. Like the accelerometer, the gyroscope may be directional or multidimensional, and/or multiple directional gyroscopes may be used. Yet another sensor may be a magnetometer, which may be used to measure magnetic orientation and thus may be used to form a compass. In other embodiments, the compass functionality may be embedded in the sensor. Another sensor may be an audio detector (e.g. a microphone). The audio detector may capture sound and generate data indicative of the sound. Another sensor may be a photodetector that detects light or other electromagnetic energy. Other exemplary sensors may include an altimeter to detect altitude, a temperature sensor, and/or a pressure sensor. Still another sensor may be a user interface device such as a button, a touch screen, a keyboard, a pointing device, a camera, etc. Any set of sensors may be employed.

As mentioned above, the always-on component 16 may be configured to buffer data in a memory within the component. If the buffer is nearing full, the always-on component 16 may be configured to wake the memory controller 22 in order to write the sensor data to the memory 12. In some embodiments, the always-on component 16 may be configured to write results of filtering the data to the memory 12. In some embodiments, the always-on component 16 may perform other processing tasks while the rest of the SOC 10 is powered down. To the extent that these tasks access the memory 12, the always-on component 16 may be configured to wake the memory controller 22. In addition, the always-on component 16 may be configured to wake at least a portion of the communication fabric 27 (i.e. the portion that connects the always-on component 16 to the memory controller 22).

Using this memory-only communication mode, the always-on component 16 may be able to access the memory 12 and take advantage of the significant storage available in the memory 12 while expending a relatively low amount of energy/power, since the remainder of the SOC 10 remains powered down. The always-on component 16 may store programmable configuration data for the memory controller 22, so that the always-on component 16 may program the memory controller 22 once power is restored. That is, the always-on component 16 may be configured to program the memory controller 22 in a manner similar to the way the operating system would program the memory controller 22 during boot of the device including the SOC 10. The programmable configuration data stored by the always-on component 16 may be the configuration data that was in the memory controller 22 when the SOC 10 (except for the always-on component 16) was most recently powered down, in one embodiment. In another embodiment, the programmable configuration data may be a configuration that is known to work for any previous configuration of the memory controller 22 and/or any configuration of the memory 12. The known-good configuration may, e.g., be a configuration that is acceptable in performance for the memory accesses by the always-on component 16.

In some embodiments, the always-on component 16 may further store programmable configuration data for other components in the SOC 10. The programmable configuration data may reflect the state of the components at the time that the remainder of the SOC 10 was most recently powered down. The always-on component 16 may be configured to wake the SOC 10 for processing, and may reprogram the components with the stored programmable configuration data. The process of restoring state to the components based on the stored programmable configuration data may be referred to as reconfiguration. Again, similar to the memory-only communication mode discussed above, the state that is restored to the components may be the state at the most recent power down of the component or may be a known-good state with acceptable performance for restarting the SOC 10 for operation. In the latter case, the state may be modified to a higher performance state after the reconfiguration has completed.

Restoring state using the reconfiguration functionality in the always-on component 16 may be a lower latency operation than restoring power in the SOC 10 and then initializing the SOC 10 and the operating system in a manner similar to a cold boot. During the initialization without the always-on component 16, the operating system discovered that the SOC 10 was previously powered down with system state stored in the memory 12, and bypassed some initialization operations. However, the latency of the restore was greater than desired. Additional details for one embodiment are discussed in more detail below.

The always-on component 16 may be configured to communicate with the PMU 156, in addition to the communication of the PMGR 32 to the PMU 156. The interface between the PMU 156 and the always-on component 16 may permit the always-on component 16 to cause components to be powered up (e.g. the memory controller 22, or the other components of the SOC 10) when the PMGR 32 is powered down. The interface may also permit the always-on component 16 to control its own power state as well.

Generally, a component may be referred to as powered on or powered off. The component may be powered on if it is receiving supply voltage so that it may operate as designed. If the component is powered off, then it is not receiving the supply voltage and is not in operation. The component may also be referred to as powered up if it is powered on, and powered down if it is powered off. Powering up a component may refer to supplying the supply voltage to a component that is powered off, and powering down the component may refer to terminating the supply of the supply voltage to the component. Similarly, any subcomponent and/or the SOC 10 as a whole may be referred to as powered up/down, etc. A component may be a predefined block of circuitry which provides a specified function within the SOC 10 and which has a specific interface to the rest of the SOC 10. Thus, the always-on component 16, the peripherals 18A-18n, and the CPU complex 14, the memory controller 22, the SEP 28, and the PMGR 32 may each be examples of a component.

A component may be active if it is powered up and not clock gated. Thus, for example, a processor in the CPU complex 14 may be available for instruction execution if it is active. A component may be inactive if it is powered off or in another low power state in which a significant delay may be experienced before instructions may be executed. For example, if the component requires a reset or a relock of a phase lock loop (PLL), it may be inactive even if it remains powered. A component may also be inactive if it is clock gated. Clock gating may refer to techniques in which the clock to the digital circuitry in the component is temporarily "turned off," preventing state from being captured from the digital circuitry in clocked storage devices such as flops, registers, etc.

As mentioned above, the CPU complex 14 may include one or more processors 30 that may serve as the CPU of the SOC 10. The CPU of the system includes the processor(s) that execute the main control software of the system, such as an operating system. Generally, software executed by the CPU during use may control the other components of the system to realize the desired functionality of the system. The processors may also execute other software, such as application programs. The application programs may provide user functionality, and may rely on the operating system for lower-level device control, scheduling, memory management, etc. Accordingly, the processors may also be referred to as application processors. The CPU complex 14 may further include other hardware such as an L2 cache and/or an interface to the other components of the system (e.g. an interface to the communication fabric 27).

Generally, a processor may include any circuitry and/or microcode configured to execute instructions defined in an instruction set architecture implemented by the processor. Processors may encompass processor cores implemented on an integrated circuit with other components as a system on a chip (SOC 10) or other levels of integration. Processors may further encompass discrete microprocessors, processor cores and/or microprocessors integrated into multichip module implementations, processors implemented as multiple integrated circuits, etc.

The memory controller 22 may generally include the circuitry for receiving memory operations from the other components of the SOC 10 and for accessing the memory 12 to complete the memory operations. The memory controller 22 may be configured to access any type of memory 12. For example, the memory 12 may be static random access memory (SRAM), dynamic RAM (DRAM) such as synchronous DRAM (SDRAM) including double data rate (DDR, DDR2, DDR3, DDR4, etc.) DRAM. Low power/mobile versions of the DDR DRAM may be supported (e.g. LPDDR, mDDR, etc.). The memory controller 22 may include queues for memory operations, for ordering (and potentially reordering) the operations and presenting the operations to the memory 12. The memory controller 22 may further include data buffers to store write data awaiting write to memory and read data awaiting return to the source of the memory operation. In some embodiments, the memory controller 22 may include a memory cache to store recently accessed memory data. In SOC implementations, for example, the memory cache may reduce power consumption in the SOC by avoiding reaccess of data from the memory 12 if it is expected to be accessed again soon. In some cases, the memory cache may also be referred to as a system cache, as opposed to private caches such as the L2 cache or caches in the processors, which serve only certain components. Additionally, in some embodiments, a system cache need not be located within the memory controller 22.

The peripherals 18A-18n may be any set of additional hardware functionality included in the SOC 10. For example, the peripherals 18A-18n may include video peripherals such as an image signal processor configured to process image capture data from a camera or other image sensor, display controllers configured to display video data on one or more display devices, graphics processing units (GPUs), video encoder/decoders, scalers, rotators, blenders, etc. The peripherals may include audio peripherals such as microphones, speakers, interfaces to microphones and speakers, audio processors, digital signal processors, mixers, etc. The peripherals may include interface controllers for various interfaces external to the SOC 10 (e.g. the peripheral 18B) including interfaces such as Universal Serial Bus (USB), peripheral component interconnect (PCI) including PCI Express (PCIe), serial and parallel ports, etc. The peripherals may include networking peripherals such as media access controllers (MACs). Any set of hardware may be included.

The communication fabric 27 may be any communication interconnect and protocol for communicating among the components of the SOC 10. The communication fabric 27 may be bus-based, including shared bus configurations, cross bar configurations, and hierarchical buses with bridges. The communication fabric 27 may also be packet-based, and may be hierarchical with bridges, cross bar, point-to-point, or other interconnects.

The PMGR 32 may be configured to control the supply voltage magnitudes requested from the PMU 156. There may be multiple supply voltages generated by the PMU 156 for the SOC 10. For example, illustrated in FIG. 1 are a $V_{CPU}$ and a $V_{SOC}$. The $V_{CPU}$ may be the supply voltage for the CPU complex 14. The $V_{SOC}$ may generally be the supply voltage for the rest of the SOC 10 outside of the CPU complex 14. For example, there may be separate supply voltages for the memory controller power domain and the always-on power domain, in addition to the $V_{SOC}$ for the other components. In another embodiment, $V_{SOC}$ may serve the memory controller 22, the always-on component 16, and the other components of the SOC 10 and power gating may be employed based on the power domains. There may be multiple supply voltages for the rest of the SOC 10, in some embodiments. In some embodiments, there may also be a memory supply voltage for various memory arrays in the CPU complex 14 and/or the SOC 10. The memory supply voltage may be used with the voltage supplied to the logic circuitry (e.g. $V_{CPU}$ or $V_{SOC}$) which may have a lower voltage magnitude than that required to ensure robust memory operation. The PMGR 32 may be under direct software control (e.g. software may directly request the power up and/or power down of components) and/or may be configured to monitor the SOC 10 and determine when various components are to be powered up or powered down.

The PMU 156 may generally include the circuitry to generate supply voltages and to provide those supply voltages to other components of the system such as the SOC 10, the memory 12 ($V_{MEM}$ in FIG. 1), various off-chip peripheral components (not shown in FIG. 1) such as display devices, image sensors, user interface devices, etc. The PMU 156 may thus include programmable voltage regulators, logic to interface to the SOC 10 and more particularly the PMGR 32 to receive voltage requests, etc.

It is noted that the number of components of the SOC 10 (and the number of subcomponents for those shown in FIG. 1, such as within the CPU complex 14) may vary from embodiment to embodiment. There may be more or fewer of each component/subcomponent than the number shown in FIG. 1.

Figure 2:
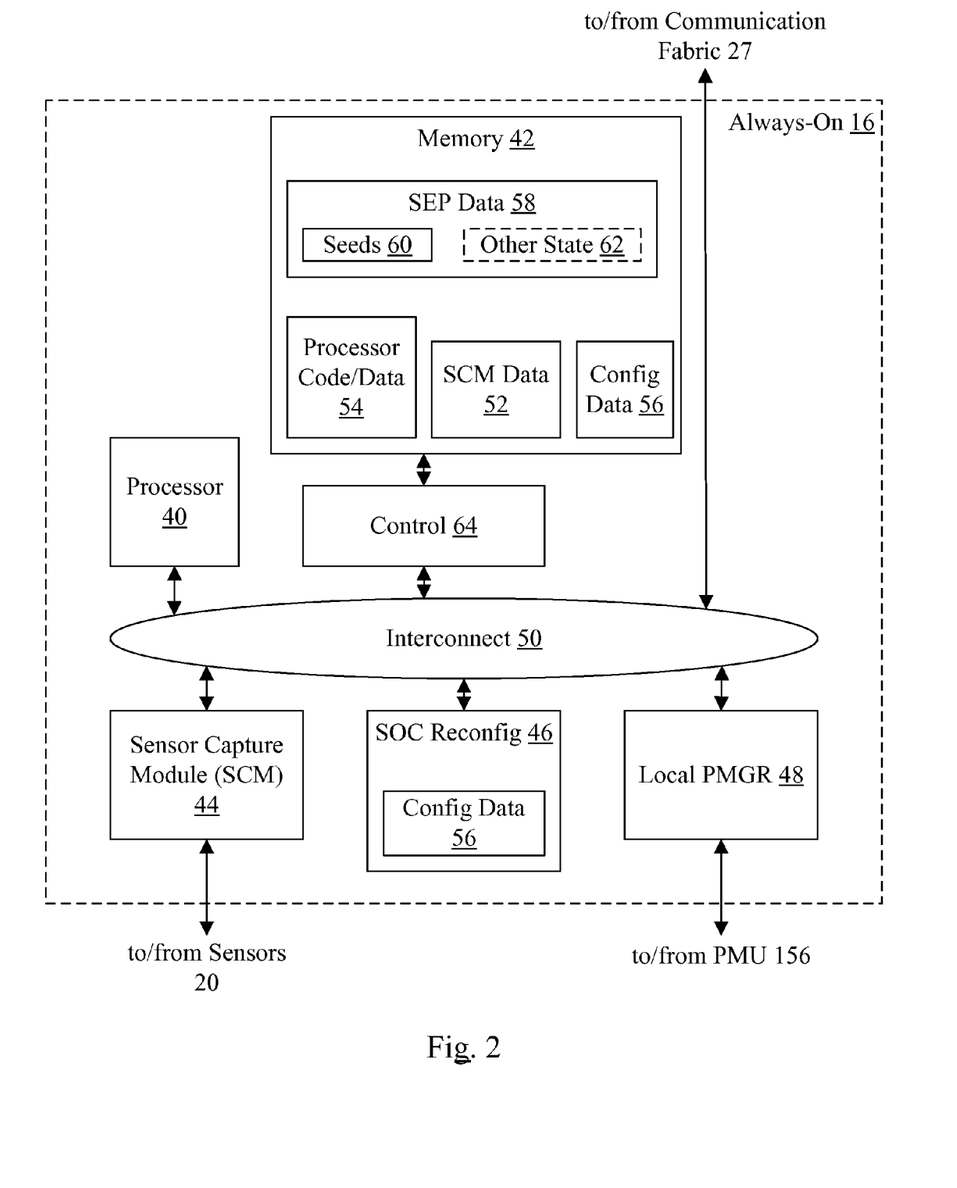
FIG. 2 is a block diagram of one embodiment of an always-on block in the SOC.

Turning now to FIG. 2, a block diagram of one embodiment of the always-on component 16 is shown. In the illustrated embodiment, the always-on component 16 may include a processor 40, a memory 42, a sensor capture module (SCM) 44, an SOC reconfiguration circuit 46, a local PMGR 48, an interconnect 50, and a control circuit 64 for the memory 42. The processor 40, the memory 42 (through the control circuit 64), the SCM 44, the SOC reconfiguration circuit 46, and the local PMGR 48 are coupled to the interconnect 50. The SCM 44 may also be referred to as a sensor capture unit or a sensor capture circuit.

The memory 42 may be configured to store various information for the always-on component 16 and other components of the SOC 10. More particularly, the memory 42 may have a section, or portion, dedicated to the SEP 28. The section may be the SEP data 58 shown in FIG. 2. The SEP data 58 may differ from the SEP data 38 shown in FIG. 1. In an embodiment, the SEP data 58 may be a subset of the SEP data 38. In another embodiment, the SEP data 58 may include data not stored in the SEP data 38. In yet another embodiment, the SEP data 58 may partially overlap with the SEP data 38.

The SEP data 58 may include data to aid the SEP 28 in returning to operation when powered up after a power down event. For example, as previously mentioned, the SEP data 58 may include one or more seeds 60 used to generate the keys that encrypted the SEP data 38 in FIG. 1. The seeds 60, along with one or more instance-specific values such as values fused into the SOC 10 during manufacture, may be used to generate the keys in an embodiment.

The SEP data 58 may include any other state 62 that may be desirable, in various embodiments. Generally, any state 62 that may permit or aid the SEP 28 in resuming operation, including access to the SEP data 38 in the memory 12, may be included. In an embodiment, the other state 62 may include valid information that indicates whether or not the seeds 60 are stored in the memory 42. The SEP 28, when checking for the SEP data 58, may use the other state 62 to determine if the SEP data 58 is valid (e.g. detecting the difference between boot from power off state and resume from suspend to RAM state). More generally, any determinations made during boot regarding the operation of the SEP 28 may be represented in the state 62. For example, configuration information that explicitly identifies the secure peripherals that are attached to the SEP 28 (such as peripherals that are external to the SOC 10 but coupled via a secure interface to the SEP 28) may be part of the state 62. As another example, data indicating which secure peripherals (internal and/or external) are trusted, disabled, etc. may be included in the state 62. Data indicating permitted use of the secure peripherals may be included in the state 62. As still another example, the state 62 may include data describing the entitlements of the SEP 28. Entitlements may be assigned by the secure software executed in the SEP 28, and my include features such as whether or not debugging is permitted, enablement of calibration mode, etc.

The control circuit 64 may decode requests to access the memory 42, and may be configured to prevent access to the section of the memory 42 storing the SEP data 58 unless the request is from the SEP 28. For example, a range of addresses in the memory 42 may be allocated to the SEP 28. If an address within the range is received, the control circuit 64 may decode other attributes of the transaction to determine whether or not the request is sourced by the SEP 28. The attributes may, e.g., include a source ID that identifies sources on the communication fabric 27. The source ID may be part of a transaction ID, in an embodiment. The source IDs may be assigned in hardware or may be configurable but not modifiable by software, and thus may be a secure mechanism for identifying the SEP 28. Thus, the control circuit 64 may serve as a filter to accesses to the SEP data 58. The control circuit 64 may perform other accesses without source restrictions, in an embodiment. In one embodiment, the always-on component 16 (and more particularly the control circuit 64) may support locking of a portion or all of the SEP address range. Locked portions may be read-only to the SEP 28, and may be used to store various configuration information for the SEP 28. If the running SEP were compromised in an attack, the locked portions may be safe from nefarious modification. In an embodiment, the always-on component 16 (and more particularly the control circuit 64) may support making a portion or all of the SEP address range inaccessible to the SEP 28. For example, the seeds 60 or encryption keys may be made inaccessible by the SEP 28 after the seeds/keys have been read (e.g. by the code from the secure ROM 34 executing on the SEP 28), thus preventing subsequent access in the case that the SEP 28 is compromised, for example. Making the SEP address range inaccessible may also be used for debug modes or cases in which the SOC 10 is operating in development mode, to prevent the exposure of secrets to the debugger.

The sensor capture module 44 may be coupled to the sensors 20 when the SOC 10 is included in a system, and may be configured to capture data from the sensors 20. In the illustrated embodiment, the sensor capture module 44 may be configured to write the captured sensor data to the memory 42 (SCM Data 52). The memory 42 may be an SRAM, for example. However, any type of memory may be used in other embodiments.

The SCM data 52 may be stored in locations that are preallocated by the always-on component 16 to store captured sensor data. As the locations are consumed, the amount of available memory to store captured data decreases. The sensor capture module 44 may be programmed with a watermark or other indication of fullness in the allocation memory area (generally, e.g., a "threshold"), and the sensor capture module 44 may be configured to wake the memory controller 22 to write the captured sensor data to memory 12. Alternatively, the processor 40 may be configured to write the captured sensor data to memory 12. In such a case, the sensor capture module 44 may be configured to wake the processor 40.

The processor 40 may be configured to execute code stored in the memory 42 (processor code/data 54). The code may include a series of instructions which, when executed, cause the processor 40 to implement various functions. For example, the code may include filter code which may be executed by the processor 40 to filter the SCM data 52, as discussed above. Responsive to detecting a desired pattern or other data attribute(s) in the SCM data 52, the processor 40 may be configured to wake the memory controller 22 to update the memory 12 and/or to wake the SOC 10.

The processor code/data 54 may be initialized upon boot of a device including the SOC 10. The code may be stored in a non-volatile memory on the SOC 10 or elsewhere in the device, and may be loaded into the memory 42, for example. A local non-volatile memory such as read-only memory (ROM) may also be used in some embodiments.

The SOC reconfiguration circuit 46 may be configured to store the programmable configuration data 56 for the memory controller 22 and the other components of the SOC 10, to reprogram various components responsive to powering the components back up from a powered off state. Alternatively, the programmable configuration data 56 may be stored in the memory 42, or in a combination of the memory 42 and the SOC reconfiguration circuit 46. The configuration data 56 may be written to the circuit 46 by the CPU processors 30, e.g. as part of programming the corresponding component. That is, the CPU processors 30 (executing operating system software, for example, as part of the boot of the device and/or at other times when the configuration is changed) may write the data to the SOC reconfiguration circuit 46. Alternatively, in some embodiments, the SOC reconfiguration circuit 46 may have hardware that monitors and shadows the configuration state. In some embodiments, at least a portion of the programmable configuration data 56 may be predetermined and may be stored in a non-volatile memory such as a ROM, rather than being written to the memory 42 and/or the SOC reconfiguration circuit 46.

In an embodiment, the SOC reconfiguration circuit 46 may include logic circuitry configured to process the programmable configuration data 56 and to write the data to the corresponding components in the SOC 10 after the SOC 10 is powered up again. The programmable configuration data 56 may include a series of register addresses to be written and the data to write to those registers. In some embodiments, the programmable configuration data 56 may further include read commands to read registers, e.g. polling for an expected value that indicates that the initialization performed by various writes is complete and/or the corresponding state is in effect in the component. The expected value may be the entire value read, or may be a portion of the value (e.g. the expected value may include a value and a mask to be applied to the read value prior to comparison). In some embodiments, the programmable configuration data 56 may further include read-modify-write commands to read registers, modify a portion of the read data, and write the modified data back to the register. For example, a second mask may be used to determine which portion of the register value is to be updated. The portion of the register masked by the second mask may not be updated when the value is written to the register.

In another embodiment, the SOC reconfiguration circuit 46 may include another processor and corresponding memory storing code for the processor (or the code may also be stored in the memory 42). The code, when executed by the processor, may cause the processor to configure the various components in the SOC 10 with the programmable configuration data 56. The code may implement the polling features described above as part of the structure of the code itself, or the programmable configuration data 56 may store the address to poll and the expected value, similar to the above discussion. In another embodiment, the processor 40 may execute software to reprogram the components of the SOC 10.

The local PMGR 48 may be configured to handle power management functions within the always-on component 16, in a manner similar to the PMGR 32 in FIG. 1 for the SOC 10 as a whole. The always-on component 16 may support multiple power states, and the local PMGR 48 may assist with transitions between those states. The local PMGR 48 may be configured to communicate with the PMU 156 to support state changes, as well as to manage the providing of supply voltages to various components of the SOC 10 as part of waking up or putting to sleep various components.

The interconnect 50 may comprise any interconnect to transmit communications between the various subcomponents shown in FIG. 2, as well as to communicate over the communication fabric 27 with other components of the SOC 10. The interconnect may include any of the examples of the communication fabric 27 discussed above with regard to FIG. 1, as desired, in various embodiments.

Figure 3:
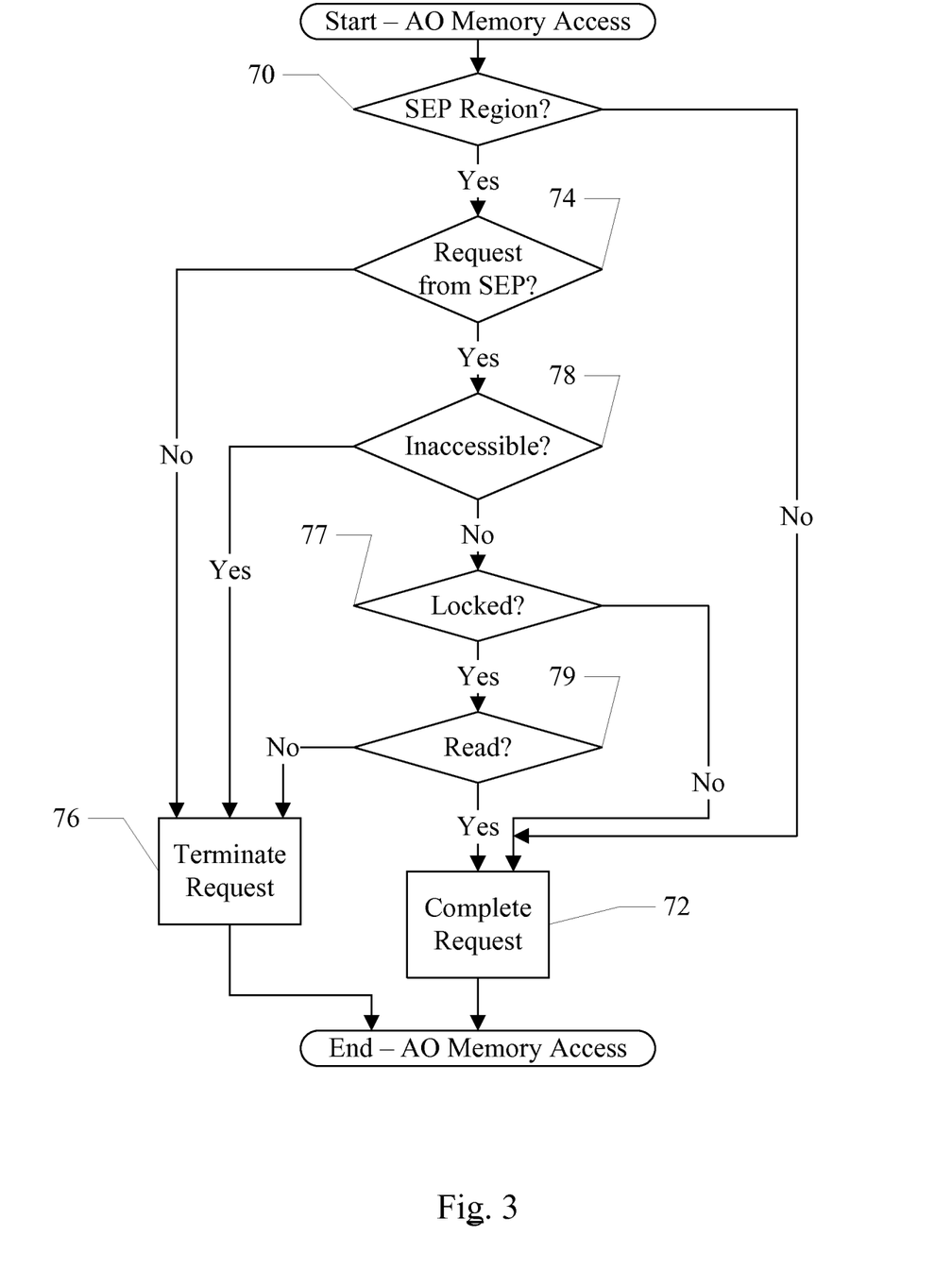
FIG. 3 is a flowchart illustrating operation of one embodiment of an always-on block in the SOC in response to an access to memory with the always-on component.

Turning now to FIG. 3, a flowchart is shown illustrating operation of one embodiment of the control circuit 64 in response to a request to access the memory 42 in the always-on component 16. While the blocks are shown in a particular order for ease of understanding, other orders may be used. Blocks may be performed in parallel in combinatorial logic in the control circuit 64. Blocks, combinations of blocks, and/or the flowchart as a whole may be pipelined over multiple clock cycles. The control circuit 64 may be configured to implement the operation illustrated in FIG. 3.

The control circuit 64 may be configured to process the address of the request and determine if the address is within the SEP region of the memory 42 (decision block 70). The SEP region may be the section or portion of the memory 42 that is dedicated to storing the SEP data 58. If the address is not in the SEP region (decision block 70, "no" leg), the control circuit 64 may complete the request, delivering data from the addressed location in the memory 42 for a read or updating the addressed location for a write (block 72). If the address is in the SEP region (decision block 70, "yes" leg) but is not a request from the SEP 28 (decision block 74, "no" leg), the control circuit 64 may terminate the request (block 76). The request may be terminated in a variety of fashions. For example, an error may be returned for the request. If the request is a write, the data for the write may silently be discarded. If the request is a read, nonce data may be returned instead of the data at the addressed location. If the address is in the SEP region (decision block 70, "yes" leg) and is a request from the SEP 28 (decision block 74, "yes" leg), but the addressed location in the SEP region is either inaccessible (decision block 78, "yes" leg) or locked and the request is a write (decision block 77, "yes" leg and decision block 79, "no" leg), the control circuit 64 may terminate the request (block 76). If the address is in the SEP region (decision block 70, "yes" leg), is a request from the SEP 28 (decision block 74, "yes" leg), the addressed location in the SEP region is accessible (decision block 78, "no" leg), and the address location is either unlocked (decision block 77, "no" leg) or the request is a read (decision block 79, "yes" leg), the control circuit 64 may complete the request (block 72).

Figure 4:
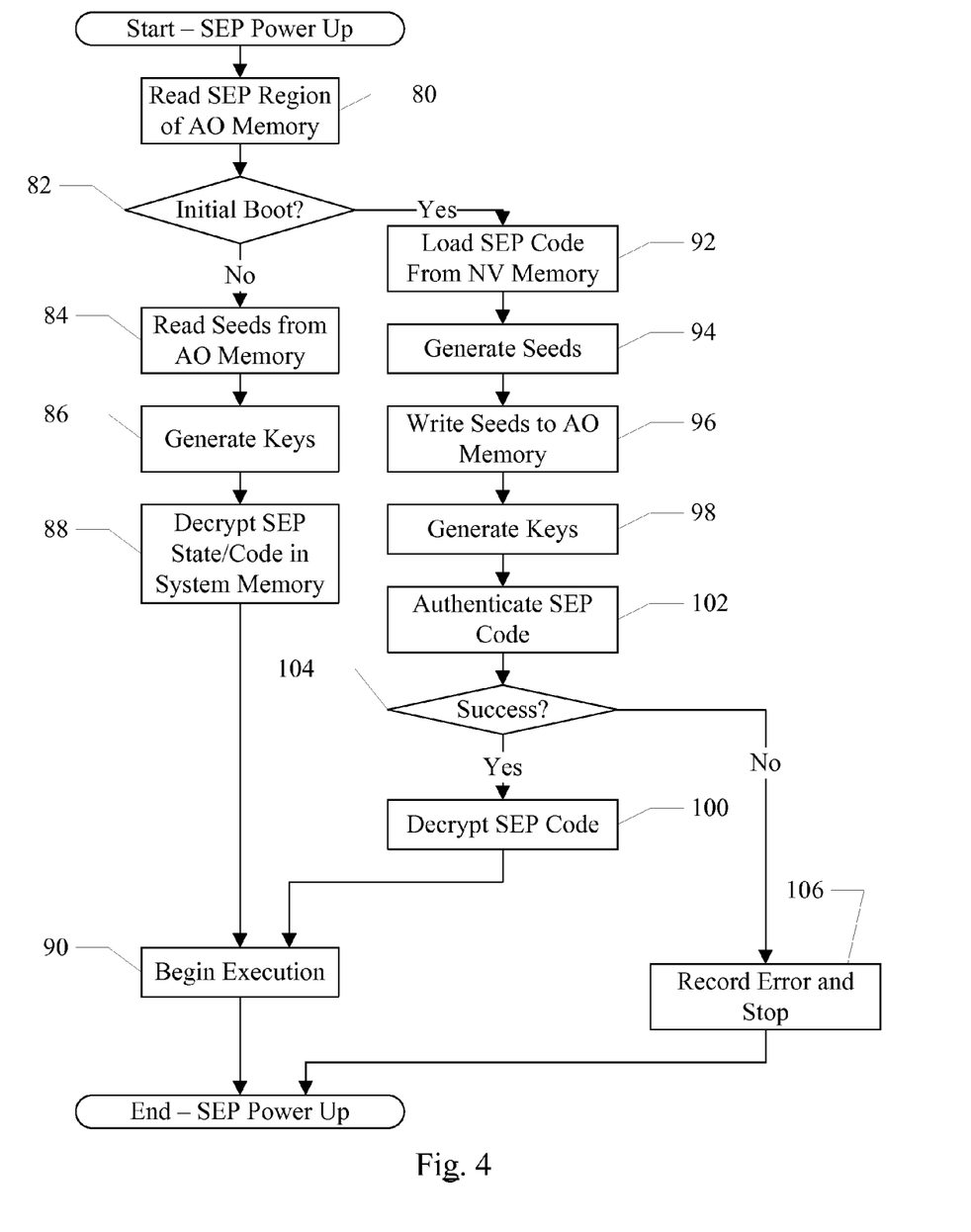
FIG. 4 is a flowchart illustrating operation of security enclave processor in response to a power up event.

FIG. 4 is a flowchart illustrating operation of one embodiment of the SEP 28 in response to a power up event, after being released from reset. Prior to the operation shown in FIG. 4, for example, reconfiguration from the always-on component 16 may be performed. While the blocks are shown in a particular order for ease of understanding, other orders may be used. Blocks may be performed in parallel in combinatorial logic in the SEP 28. Blocks, combinations of blocks, and/or the flowchart as a whole may be pipelined over multiple clock cycles. The SEP 28 may be configured to implement the operation illustrated in FIG. 4. More particularly, in an embodiment, the SEP processor 32 may execute code from the secure ROM 34 to implement the operation shown in FIG. 4.

The SEP processor 32 may determine if the power up event is an initial boot, rather than a return from a power conservation state such as the suspend to RAM state mentioned previously. In this embodiment, the SEP processor 32 may make the determination by reading data from the always-on component 16. Other embodiments may make the determination in other fashions. The SEP processor 32 may read the memory 42 in the always-on component 16 (the "AO memory"). Particularly, the SEP processor 32 may read the SEP data 58 or a portion thereof from the AO memory 42 (block 80). Since the read is from the SEP 28, the read may be permitted by the always-on component 16 and the data stored in the addressed memory location may be returned. The SEP processor 32 may examine the read data to determine if the power up is an initial boot (e.g. if valid state has been read—decision block 82). For example, the read data may explicitly include validity information (e.g. a valid bit) indicating that the memory region is storing valid SEP state. Alternatively, the data itself may be analyzed. For example, seed data is non-zero, but the AO memory 42 may be initialized to zero at boot. Accordingly, if the seed data memory locations are read and are non-zero, the memory region is storing valid SEP state. If the state is not valid, the power on event may be part of a boot and the SEP 28 may be initialized. Generally, booting a system may refer to an initial power on from a completely off state. The hardware in the system may be initialized at boot to a known state so that software can be executed. A power up event that occurs after boot (and thus reconfiguration may have been performed) may not require as much initialization. For example, the SEP 28 may already have the encrypted SEP data 38 stored in the memory 12, including authenticated code ready for execution.

If the SEP state in the AO memory 42 is valid (and thus the power up event is not an initial boot—decision block 82, "no" leg), the SEP 28 may read the seeds from the AO memory 42 (block 84). In embodiments in which the seeds are used to judge the validity, block 84 may be eliminated. The SEP 28 may generate the keys for the decrypting the encrypted SEP data 38 in the memory 12 (block 86). The key generation may be responsive to the seeds as well as one or more instant-specific values (e.g. values fused into the SOC 10 at manufacture). Since the seeds and instance-specific values were used to generate the keys previously, the same keys may be generated at block 86 as were generated previously. Accordingly, the keys may be used to decrypt the SEP data 38 in the memory 12 (block 88). The decryption may be performed as needed (e.g. the code within the data 38 may be cached by the SEP processor 32 and thus the code may be decrypted as fetched from the memory 12). The SEP processor 32 may begin execution of the code from the memory 12 (block 90). Accordingly, the process of loading the code from a code source (e.g. a non-volatile (NV) memory or other source) to the memory 12 and authenticating the code may be avoided.

If the SEP state in the AO memory 42 is not valid (and thus the power up event is an initial boot—decision block 82, "yes" leg), the SEP 28 may read the SEP code to be installed in the memory 12 as part of the SEP data 38 from an NV memory (block 92). The NV memory may be coupled to a private interface to the SEP 28 (e.g. through one of the security peripherals 36) or may be an NV memory coupled to the SOC 10 through another interface. If the NV memory is coupled to the SOC 10 through another interface, the encryption of the code may prevent tampering/observation by third parties. Alternatively or in addition, access to the NV memory (or the section of the NV memory storing the code) may be prevented except for the SEP 28. The SEP 28 may generate the seeds to be used to generate the keys (block 94). In an embodiment, the seeds may be randomly generated. The SEP 28 may write the generate seeds to the AO memory 42 (e.g. the seeds 60 in FIG. 2—block 96). Alternatively, the seeds may be written to the AO memory 42 at any other point in time up until a power down event occurs for the SEP 28. Responsive to the seeds and one or more instance-specific values, the SEP 28 may generate the keys (block 98). The SEP 28 may authenticate the SEP code (block 102). If the SEP code is successfully authenticated (decision block 104, "yes" leg), the SEP 28 may decrypt the SEP code and install the SEP code in the memory 12 (block 100). Installing the code in the memory 12 may include re-encrypting the code using the generated keys (from block 98). The SEP 28 may begin execution of the code from the memory 12 (block 90). If the SEP code is not successfully authenticated (decision block 104, "no" leg), the SEP 28 may record the error and stop execution (block 106). The error may be recorded in a status register accessible to software and/or a memory location predetermined to store error state. The authentication and decryption may use different key(s) than those generated at block 98, in an embodiment, since the key(s) generated at block 98 were not available at the time the code was encrypted, signed, and written to the NV memory. As mentioned previously, blocks may be performed in various orders as desired. For example, the generation of the seeds and keys and the writing of the seeds to memory (blocks 94, 96, and 98) may be performed in any order with respect to loading the SEP code from the NV memory and authenticating and decrypting the code (blocks 100, 102, and 104). In some embodiments, the SEP code may be decrypted before authentication. In such a case, if the decrypted SEP code is written to the memory 12 or other non-secured memory, the SEP 28 may zero out the memory if authentication is unsuccessful so the non-authenticated code is not available, for example.

Figure 5:
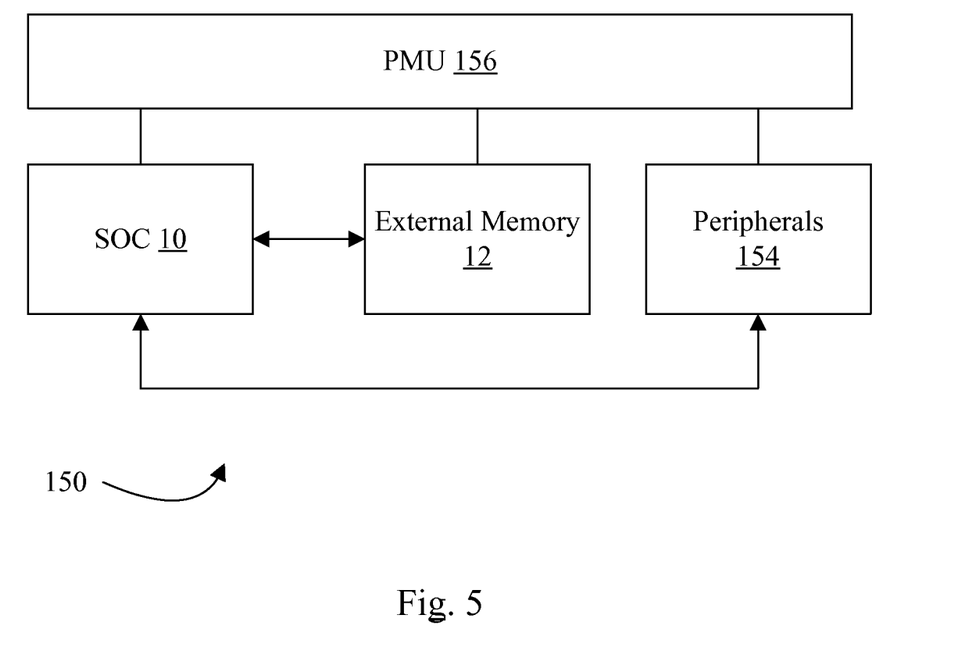
FIG. 5 is a block diagram of one embodiment of a system including the SOC shown in FIG. 1.

Turning next to FIG. 5, a block diagram of one embodiment of a system 150 is shown. In the illustrated embodiment, the system 150 includes at least one instance of the SOC 10 coupled to one or more peripherals 154 and the external memory 12. The PMU 156 is provided which supplies the supply voltages to the SOC 10 as well as one or more supply voltages to the memory 12 and/or the peripherals 154. In some embodiments, more than one instance of the SOC 10 may be included (and more than one memory 12 may be included as well).

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as wifi, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc. In the embodiment of FIG. 1, the peripherals 154 may include the sensors 20. In other embodiments, the system 150 may be any type of computing system (e.g. desktop personal computer, laptop, workstation, net top etc.).

The external memory 12 may include any type of memory. For example, the external memory 12 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g. LPDDR, mDDR, etc.), etc. The external memory 12 may include one or more memory modules to which the memory devices are mounted, such as single inline memory modules (SIMMs), dual inline memory modules (DIMMs), etc. Alternatively, the external memory 12 may include one or more memory devices that are mounted on the SOC 10 in a chip-on-chip or package-on-package implementation.

Figure 6:
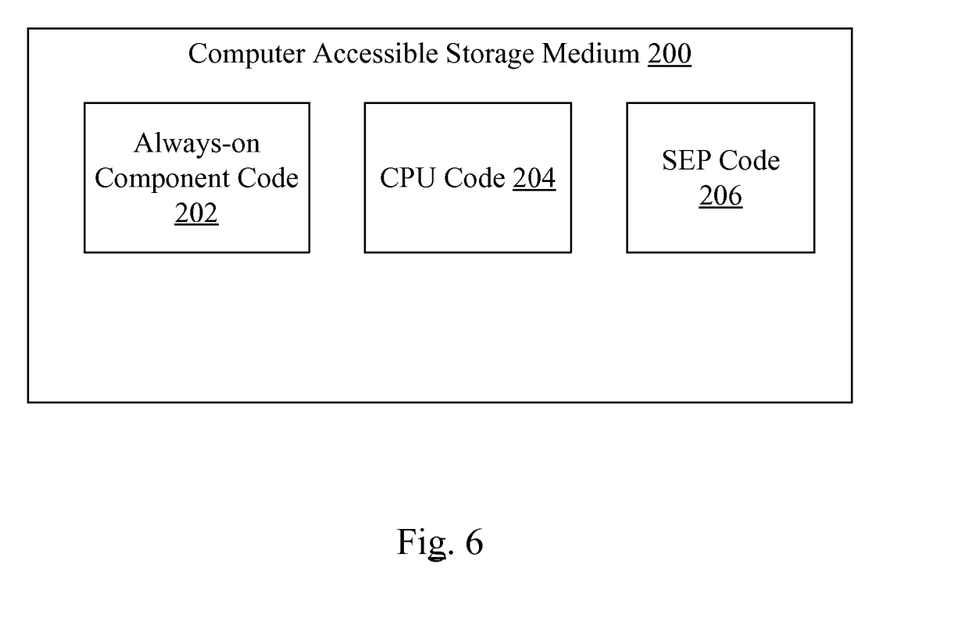
FIG. 6 is a block diagram of one embodiment of a computer accessible storage medium.

FIG. 6 is a block diagram of one embodiment of a computer accessible storage medium 200 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 200 may store data in a non-transitory manner, where non-transitory in this context may refer to not transmitting the instructions/data on a signal. For example, non-transitory storage may be volatile (and may lose the stored instructions/data in response to a power down) or non-volatile.

The computer accessible storage medium 200 in FIG. 6 may store always-on component code 202. The always-on component code 202 may include instructions which, when executed by the processor 40, implement the operation described for the code above. The always-on component code 202 may include the processor code 54 shown in FIG. 2, for example. The computer accessible storage medium 200 may further include CPU code 204. The CPU code 204 may include code executed by the CPU processors 30. The computer accessible storage medium 200 may further store SEP code 206, which may include the code in the NV memory and moved to the memory 12, and/or the secure ROM code in the secure ROM 34. The SEP code 206, when executed by the SEP processor 32, may implement the operation described above for the SEP code. Various embodiments of the computer accessible storage medium 200 may store any combination of one or more of the code 202, 204, and 206 and/or any other code or data, as desired.

A carrier medium may include computer accessible storage media as well as transmission media such as wired or wireless transmission.

Numerous variations and modifications will become apparent to those skilled in the art once the above disclosure is fully appreciated. It is intended that the following claims be interpreted to embrace all such variations and modifications.

What is claimed is:

1. A system comprising:
a system memory;
a memory controller coupled to the system memory;
a central processing unit (CPU) processor coupled to the memory controller;
a secure component coupled to the memory controller, wherein a first portion of the system memory is dedicated to storing first data for the secure component during use, wherein the secure component comprises a secure processor, and wherein the first data includes code executed by the secure processor during use, and wherein the secure component is protected from access by other components of the system during use, including the CPU processor; and
a first component coupled to the secure component and the memory controller, wherein the first component is powered on during use at least some times when the secure component and the memory controller are powered off, and wherein the first component includes a first memory, and wherein a second portion of the first memory is dedicated to storing second data for the secure component during use, and wherein the first component is configured to prevent access to the second data except by the secure component, wherein the secure component is configured to write the second data to a valid state during an initial boot of the secure component, wherein the initial boot is responsive to a power on of the system, wherein the second data in the valid state indicates that the code was authenticated during the initial boot and the first data is stored in the system memory in encrypted form, and wherein the secure component is configured to continue execution after a power up event without re-authenticating the code responsive to detecting the second data in the first memory.

2. The system as recited in claim 1 wherein the second data includes one or more seeds from which one or more encryption keys used to encrypt the first data are generated.

3. The system as recited in claim 2 wherein the secure component is configured to randomly generate the one or more seeds during the initial boot.

4. The system as recited in claim 2 wherein the secure component is configured to power down, during use, and wherein the secure component is configured to read the one or more seeds during power up to regenerate the one or more keys.

5. The system as recited in claim 1 wherein the secure component is configured to load the code into the first portion of the system memory during the initial boot, and wherein the secure component is configured to authenticate the code during the initial boot.

6. The system as recited in claim 1 wherein the first component is coupled to receive requests to access the first memory, and wherein each request includes an identifier of a source of the request, and wherein the first component is configured to prevent access to the second portion except by the secure component using the identifier.

7. The system as recited in claim 1 wherein the memory controller, the secure component, and the first component are integrated onto a single semiconductor substrate as a system on a chip (SOC).

8. The system as recited in claim 1 wherein the system memory is in a data retention mode during times that the memory controller and the secure component are powered off and the first component is powered on.

9. A non-transitory computer accessible storage medium storing a plurality of instructions to be executed on a secure processor in a system that also includes a central processing unit (CPU) processor, wherein the secure processor is protected from access by other components of the system including the CPU processor, wherein the plurality of instructions, when executed by the secure processor:
during an initial boot of the system in response to a power on of the system, write first data to a valid state in a first memory included in a first component of a system on a chip (SOC), wherein the first component remains powered when the SOC is powered, even if other components of the SOC including the secure processor and the CPU processor are powered off;
in response to a subsequent power on of the secure processor, after a power off of the secure processor while the first component remains powered, read the first data from the first memory;
detect whether or not the first data read from the first memory is in the valid state; and
begin execution from code stored in a system memory coupled to the SOC after a power up event and without re-authenticating the code responsive to detecting that the first data is in the valid state, wherein the first data in the valid state indicates that the code was authenticated during the initial boot and the code is stored in the system memory in encrypted form.

10. The non-transitory computer accessible storage medium as recited in claim 9 wherein the plurality of instructions, when executed:
authenticate the code responsive to detecting that the first data is not in the valid state; and
load the code into the system memory.

11. The non-transitory computer accessible storage medium as recited in claim 10 wherein the plurality of instructions, when executed:
determine that the authentication failed;
record an indication of the failed authentication; and
stop execution of the secure processor.

12. The computer accessible storage medium as recited in claim 10 wherein the plurality of instructions, when executed:
decrypt the code from a code source prior to authenticating the code; and
encrypt the code in the system memory.

13. An integrated circuit comprising:
a memory controller configured to couple to a first memory that is external to the integrated circuit;
a central processing unit (CPU) processor coupled to the memory controller;
a secure component coupled to the memory controller, wherein the secure component includes a secure processor that is configured to execute authenticated code that is stored in the first memory during use, and wherein the secure component is protected from access by other components in the integrated circuit including the CPU processor; and
a first component comprising a second memory, wherein the first component remains powered on during at least some times that the memory controller, the CPU processor, and the secure component are powered off during use, and wherein the second memory is configured to store secure component state to permit the secure component to access the authenticated code in the first memory in response to powering on again, wherein the secure component is configured to write the secure component state to a valid state during an initial boot of the secure component, wherein the initial boot is responsive to a power on of the system, wherein the secure component state in the valid state indicates that the authenticated code was authenticated during the initial boot and the authenticated code is stored in the first memory in encrypted form, and wherein the secure component is configured to continue execution after a power up event without re-authenticating the code responsive to detecting that the secure component state is in the valid state in the second memory.

14. The integrated circuit as recited in claim 13 wherein the secure component state includes data used to decrypt the authenticated code from the first memory.

15. The integrated circuit as recited in claim 14 wherein the data includes one or more seeds from which the secure component is configured to generate one or more encryption keys.

16. The integrated circuit as recited in claim 15 wherein secure component is configured to encrypt the code to write the code into the first memory during the initial boot, wherein the secure component is configured to encrypt the code using the one or more encryption keys.

17. The integrated circuit as recited in claim 15 wherein the secure component is configured to randomly generate the one or more seeds during the initial boot and wherein the secure component is configured to write the one or more seeds in the second memory.

18. The integrated circuit as recited in claim 17 wherein the secure component is configured to write the one or more seeds in the second memory during the initial boot.

* * * * *